United States Patent Office.

WALTHER NERNST, OF GÖTTINGEN, GERMANY, ASSIGNOR TO GEORGE WESTINGHOUSE, OF PITTSBURG, PENNSYLVANIA.

GLOWER FOR ELECTRIC LAMPS.

SPECIFICATION forming part of Letters Patent No. 685,732, dated October 29, 1901.

Application filed August 24, 1899. Renewed April 13, 1900. Serial No. 12,689. (No specimens.)

*To all whom it may concern:*

Be it known that I, WALTHER NERNST, a subject of the Emperor of Germany, residing in Göttingen, Germany, have invented certain new and useful Improvements in Glowers for Electric Lamps, of which the following is a specification.

The chief requirements for glowers formed from materials which are non-conductors when cold, but which become conductors when heated, are that they shall operate for a considerable period with but little change in the voltage required to cause a given current to flow through them, that they shall vary as little as possible in the amount of light which they emit during their period of operation, and that they shall have mechanical strength sufficient to withstand ordinary use. I have experimented with a very great number of those substances which increase in conductivity as they become heated, and I have subjected them to a great variety of tests and have used them for actual lighting purposes during many hours of service. I find that one of the mixtures which meets the requirements specified above in a high degree of completeness is one composed of about eighty parts of oxid of zirconium, about ten parts of oxid of erbium, and about ten parts of oxid of yttrium.

My present invention relates to improvements in electric-lamp glowers of the Nernst class, which consists in giving to such glowers approximately the composition above set forth.

The manner in which I make a glower having the constituent elements above set forth is to take about eighty parts of the oxid of zirconium, about ten parts of the oxid of erbium, and about ten parts of the oxid of yttrium, all in a powdered state, and form from them a paste by adding water and some binding material, such as tragacanth, dextrine, or the like. The powdered oxids are first fully mixed together, and the binding material is also finely powdered and thoroughly mixed with the oxids. Sufficient water is added to form a paste, and the glowers are then shaped by any preferred process. In case the glowers are to be tubular in form the pasty material is passed through a press and shaped by that means.

I claim as my invention—

A glower for electric lamps, composed, approximately, of eighty parts of the oxid of zirconium, ten parts of the oxid of erbium, and ten parts of the oxid of yttrium.

Signed by me at Berlin this 10th day of August, 1899.

WALTHER NERNST.

Witnesses:
HENRY NOEL POTTER,
WOLDEMAR HAUPT.